US012563247B2

(12) United States Patent
Kalish

(10) Patent No.: US 12,563,247 B2
(45) Date of Patent: Feb. 24, 2026

(54) SYSTEM AND METHOD OF TRACKING VIDEO USAGE IN COMMUNICATION NETWORK

(71) Applicant: Idomoo LTD, Raanana (IL)

(72) Inventor: Danny Kalish, Raanana (IL)

(73) Assignee: Idomoo LTD, Raanana (IL)

( * ) Notice: Subject to any disclaimer, the term of this patent is extended or adjusted under 35 U.S.C. 154(b) by 0 days.

(21) Appl. No.: 18/786,174

(22) Filed: Jul. 26, 2024

(65) Prior Publication Data

US 2025/0039482 A1 Jan. 30, 2025

Related U.S. Application Data

(60) Provisional application No. 63/515,649, filed on Jul. 26, 2023.

(51) Int. Cl.
*H04N 21/24* (2011.01)
*H04N 21/235* (2011.01)

(52) U.S. Cl.
CPC ..... *H04N 21/2407* (2013.01); *H04N 21/2353* (2013.01)

(58) Field of Classification Search
CPC ........... H04N 21/2407; H04N 21/2353; H04N 21/44204; H04N 21/44226; H04N 21/6582
See application file for complete search history.

(56) References Cited

U.S. PATENT DOCUMENTS

| | | | | |
|---|---|---|---|---|
| 8,213,521 | B2 * | 7/2012 | Deng | ............... H04N 21/44224 375/240.26 |
| 8,990,142 | B2 * | 3/2015 | Lynch | .................... G10L 25/51 455/2.01 |
| 10,602,202 | B1 * | 3/2020 | Taylor | ..................... G06F 16/48 |
| 11,133,037 | B1 * | 9/2021 | Kalish | .............. H04N 21/23106 |
| 2004/0024633 | A1 * | 2/2004 | Whymark | .............. G06Q 30/02 348/E7.063 |
| 2010/0131969 | A1 * | 5/2010 | Tidwell | .............. H04N 21/4667 725/93 |
| 2010/0251305 | A1 * | 9/2010 | Kimble | .............. H04N 7/17318 725/46 |
| 2013/0014223 | A1 * | 1/2013 | Bhatia | .................... H04H 60/31 726/4 |
| 2013/0179995 | A1 * | 7/2013 | Basile | .................... G06F 21/10 726/32 |

(Continued)

*Primary Examiner* — Fernando Alcon
(74) *Attorney, Agent, or Firm* — FisherBroyles, LLP; Roger L. Browdy; James E. Mrose

(57) ABSTRACT

The present invention discloses a method for tracking video usage/views at any communication device/platform, wherein the video is distributed thorough different social networks or messaging platforms, said method comprising the steps of:

generating for each original video hash code which identifies the video and registering video at a designated server;

tracking video streaming request by the video player or by communication device marking the video in the metadata or header the video was tracked (location ip address)

identifying tracked video by computing hash code of the video and transmitting computed hash to designated commination server;

aggregating reports of transmitted hash code at the designated server, identifying the original video for each transmitted hash code;

computing number of views/stream request for each original video.

17 Claims, 5 Drawing Sheets

(56)                References Cited

U.S. PATENT DOCUMENTS

| | | | | |
|---|---|---|---|---|
| 2013/0283053 | A1* | 10/2013 | Hwang | H04N 21/2362 |
| | | | | 713/168 |
| 2014/0074783 | A1* | 3/2014 | Alsina | G06Q 10/10 |
| | | | | 707/624 |
| 2015/0106505 | A1* | 4/2015 | Ramaswamy | H04N 21/4532 |
| | | | | 709/224 |
| 2015/0288513 | A1* | 10/2015 | Nelson | H04N 21/2353 |
| | | | | 380/44 |
| 2015/0319490 | A1* | 11/2015 | Besehanic | H04N 21/437 |
| | | | | 725/19 |
| 2016/0295248 | A1* | 10/2016 | Carney Landow | |
| | | | | H04N 21/4532 |
| 2017/0289226 | A1* | 10/2017 | Deshpande | H04L 67/14 |
| 2019/0058908 | A1* | 2/2019 | Orlowski | H04N 21/6582 |
| 2023/0232073 | A1* | 7/2023 | Mowrer | H04N 21/4516 |
| | | | | 725/34 |

* cited by examiner

Fig. 1A

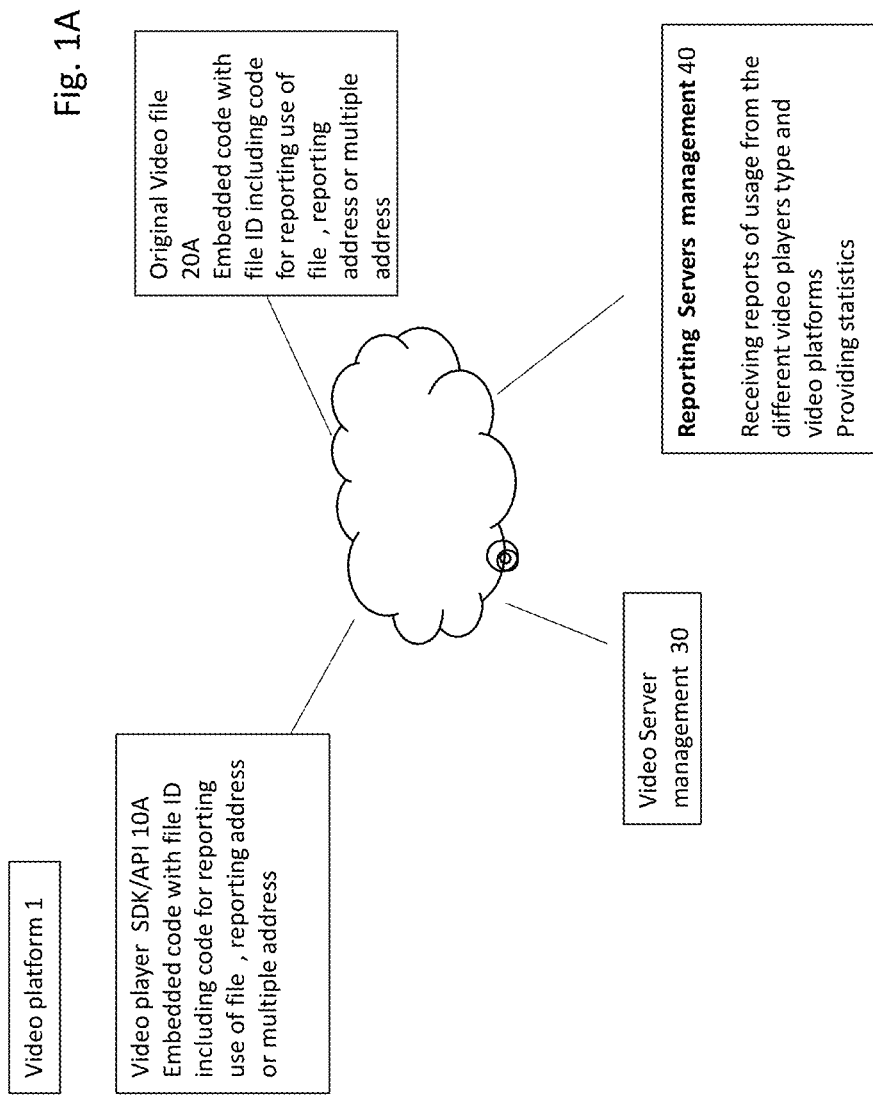

Original Video file
20A
Embedded code with
file ID including code
for reporting use of
file , reporting
address or multiple
address Reporting Servers management 40

Receiving reports of usage from the
different video players type and
video platforms
Providing statistics Video Server
management 30

Video platform 1

Video player SDK/API 10A
Embedded code with file ID
including code for reporting
use of file , reporting address
or multiple address

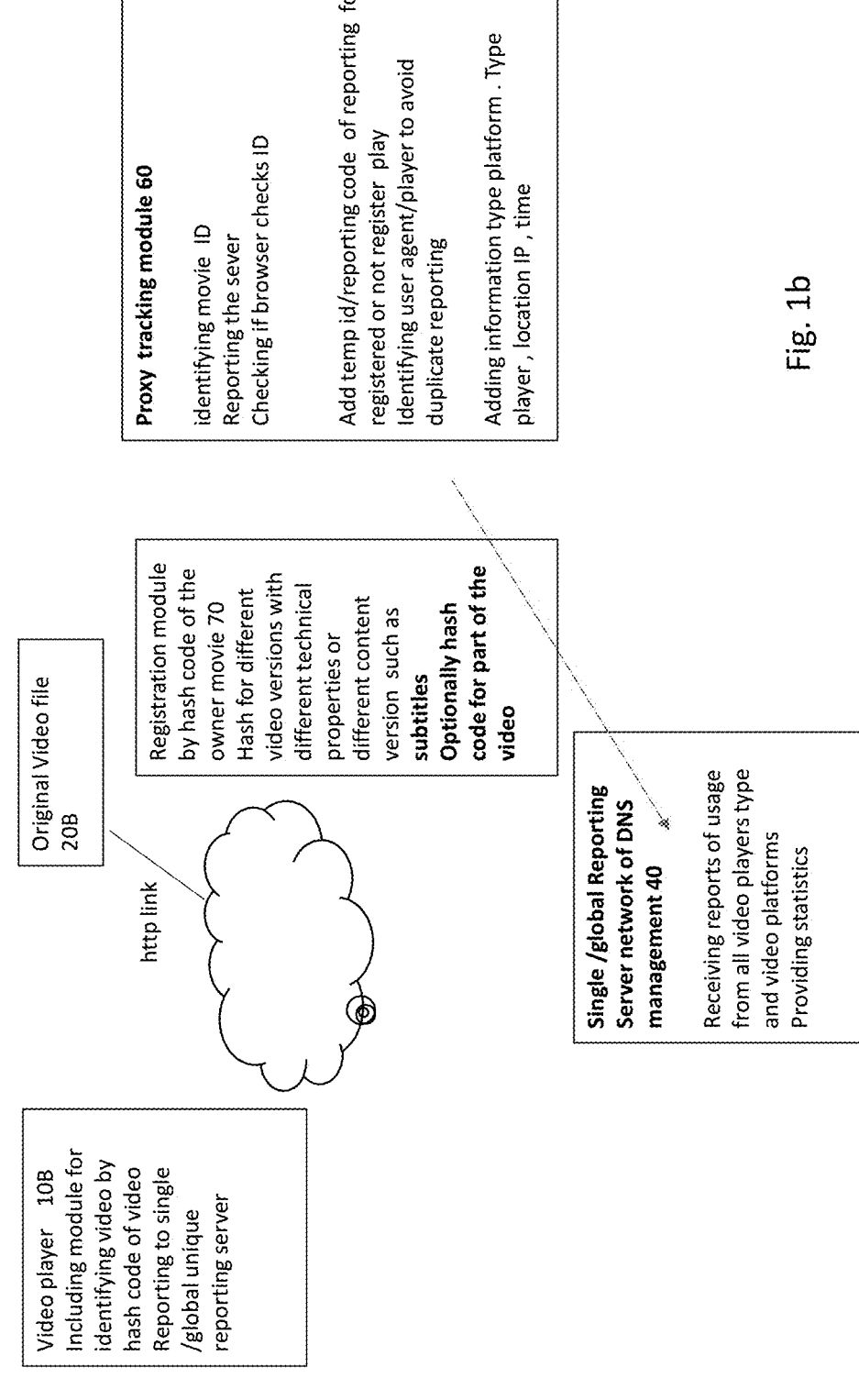

Proxy tracking module 60 identifying movie ID
Reporting the sever
Checking if browser checks ID

Add temp id/reporting code of reporting for registered or not register play
Identifying user agent/player to avoid duplicate reporting Adding information type platform . Type player , location IP , time Registration module by hash code of the owner movie 70
Hash for different video versions with different technical properties or different content version such as subtitles
Optionally hash code for part of the video

Original Video file 20B http link

Single /global Reporting Server network of DNS management 40

Receiving reports of usage from all video players type and video platforms
Providing statistics Video platform Video player 10B
Including module for identifying video by hash code of video
Reporting to single /global unique reporting server

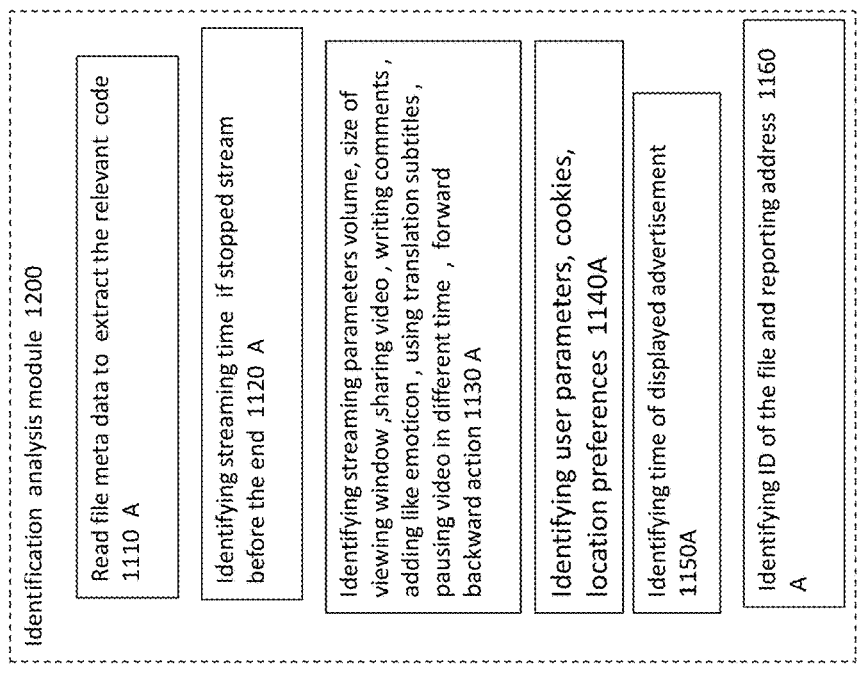

Identification analysis module 1200

Read file meta data to extract the relevant code 1110 A

Identifying streaming time if stopped stream before the end 1120 A

Identifying streaming parameters volume, size of viewing window ,sharing video , writing comments , adding like emoticon , using translation subtitles , pausing video in different time , forward backward action 1130 A Identifying user parameters, cookies, location preferences 1140A Identifying time of displayed advertisement 1150A Identifying ID of the file and reporting address 1160 A

Fig. 2A

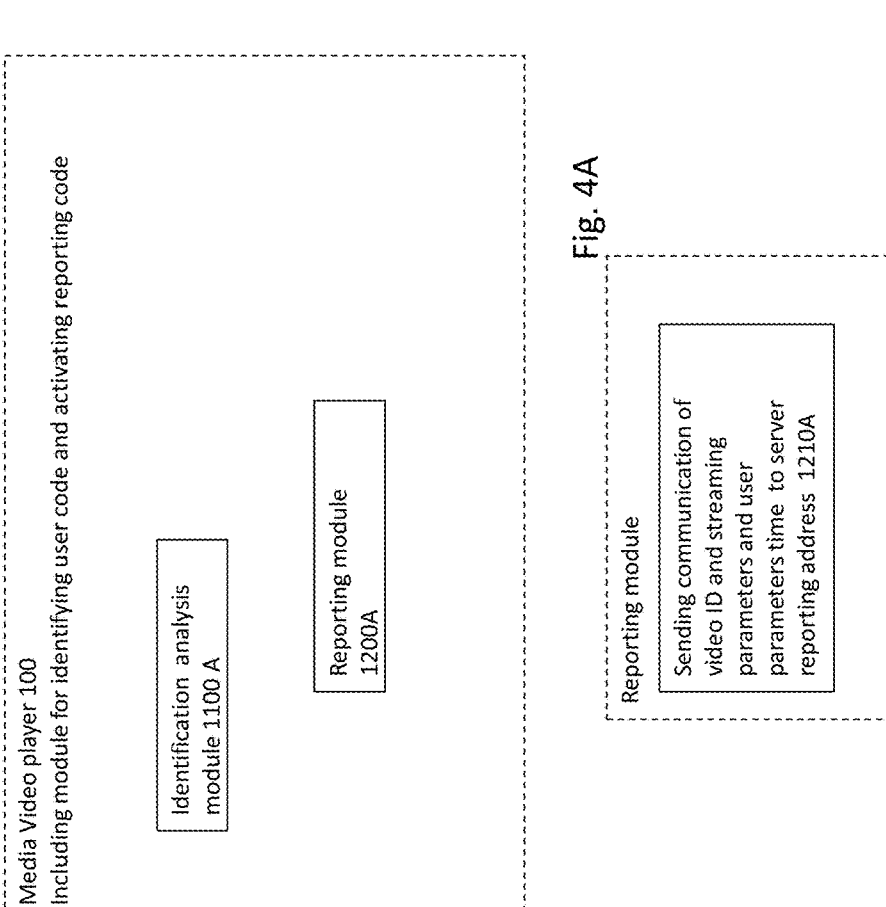

Media Video player 100
Including module for identifying user code and activating reporting code Identification analysis module 1100 A Reporting module 1200A

Fig. 4A

Reporting module

Sending communication of video ID and streaming parameters and user parameters time to server reporting address 1210A

Fig. 3B

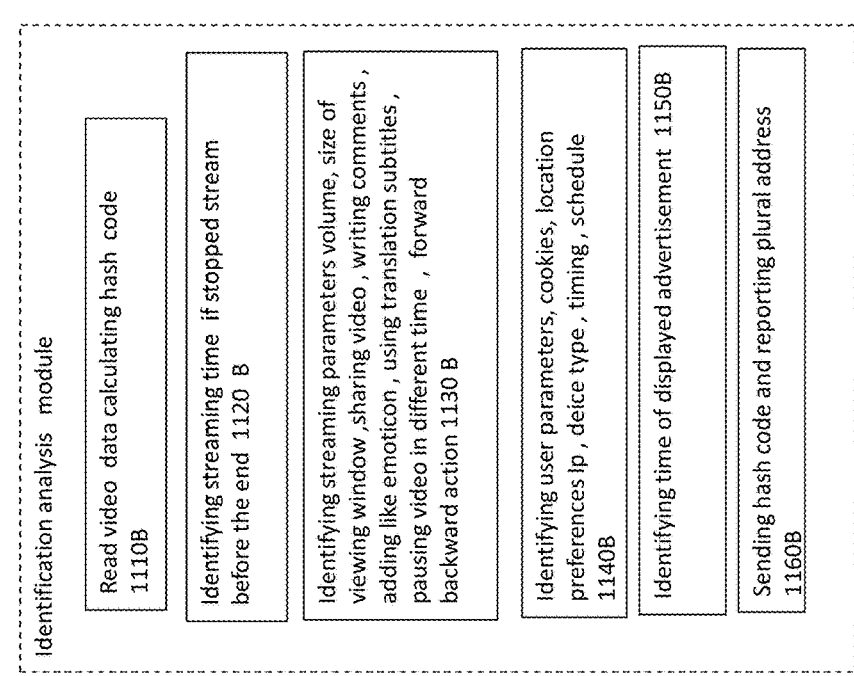

Identification analysis  module

Read video  data calculating hash code 1110B

Identifying streaming time  if stopped stream before the end  1120  B

Identifying streaming parameters volume, size of viewing window ,sharing video , writing comments , adding like emoticon , using translation subtitles , pausing video in different time ,  forward backward action 1130 B Identifying user parameters, cookies, location preferences Ip , deice type , timing , schedule 1140B Identifying time of displayed advertisement  1150B Sending hash code and reporting plural address 1160B

Fig. 2B

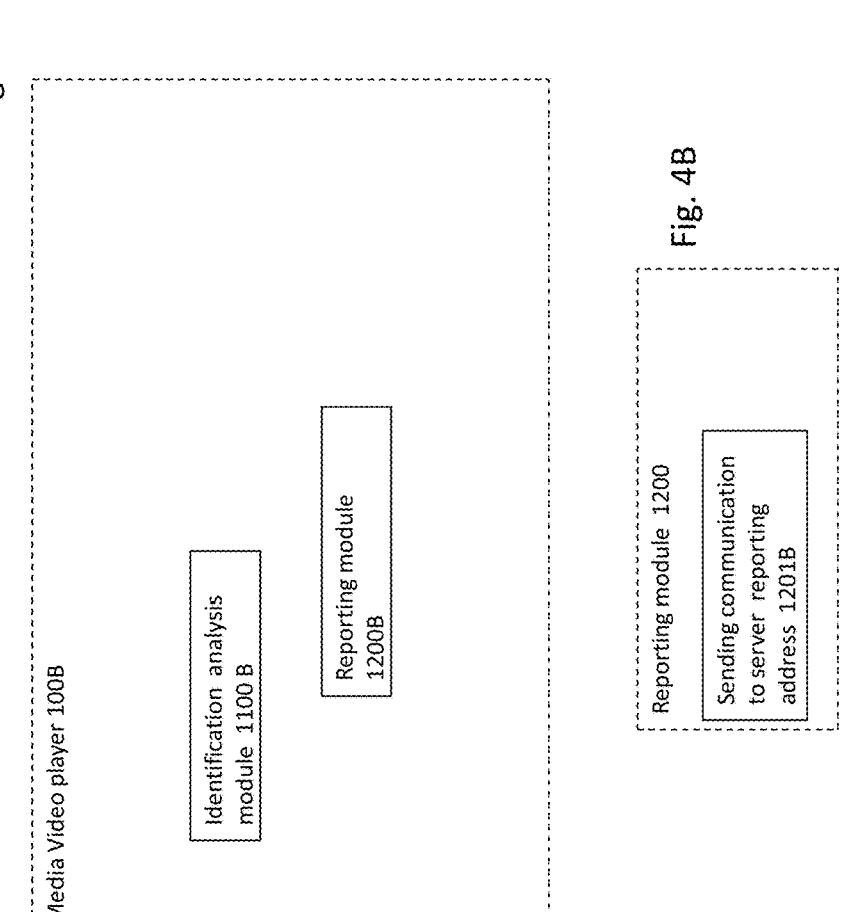

Media Video player 100B

Identification  analysis module 1100 B

Reporting module 1200B

Fig. 4B

Reporting module 1200

Sending communication to server  reporting address  1201B

Fig. 5

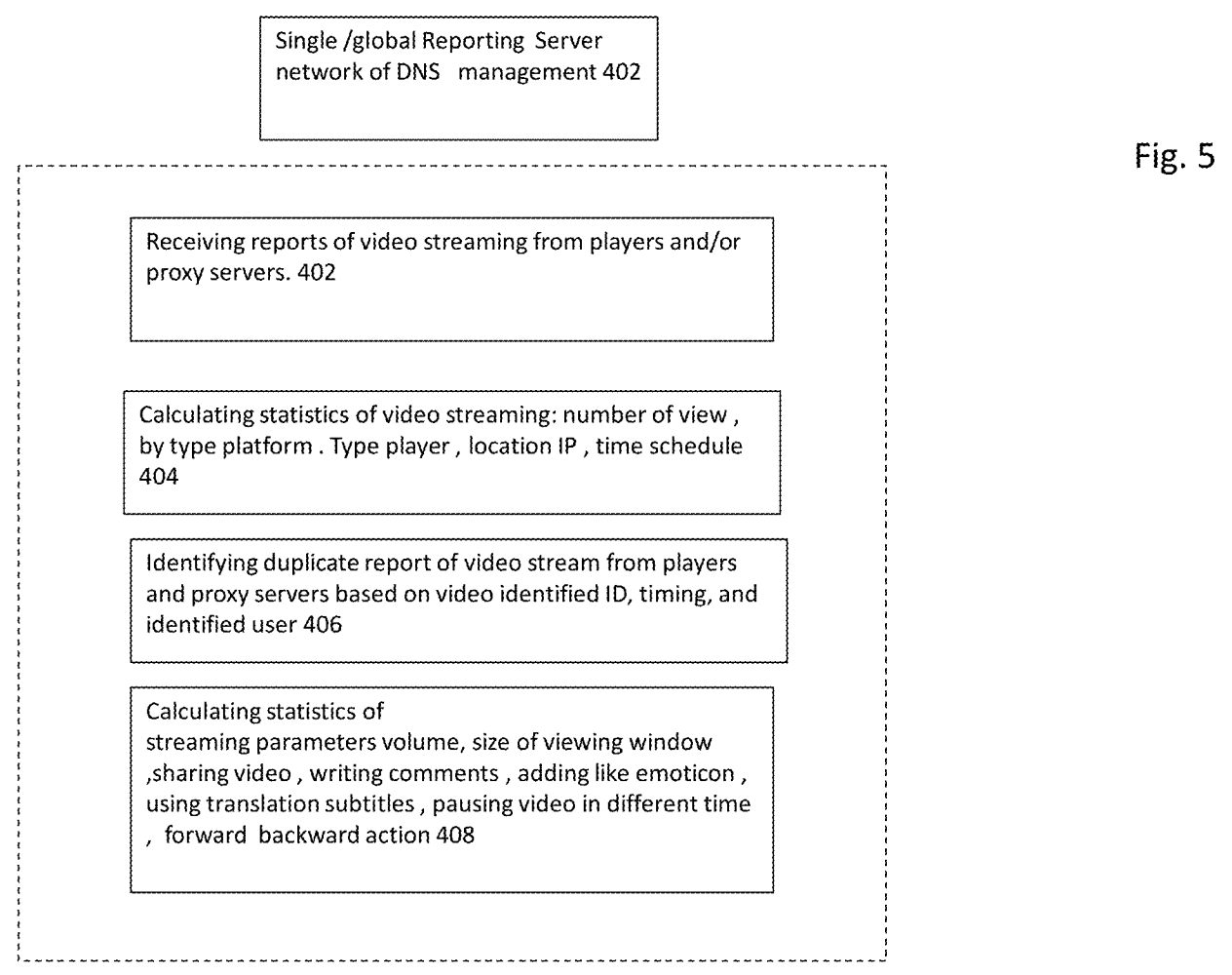

Single /global Reporting Server
network of DNS management 402

Receiving reports of video streaming from players and/or
proxy servers. 402

Calculating statistics of video streaming: number of view,
by type platform . Type player , location IP , time schedule
404

Identifying duplicate report of video stream from players
and proxy servers based on video identified ID, timing, and
identified user 406

Calculating statistics of
streaming parameters volume, size of viewing window
,sharing video , writing comments , adding like emoticon ,
using translation subtitles , pausing video in different time
, forward backward action 408

SYSTEM AND METHOD OF TRACKING VIDEO USAGE IN COMMUNICATION NETWORK

FIELD OF THE INVENTION

The present invention relates generally to tracking video usage in communication networks.

SUMMARY OF THE INVENTION

The present invention discloses a method for tracking video usage/views across various communication devices and platforms, including distribution through social networks or messaging platforms, comprising the following steps:

1. Generating a unique hash code for each original video to serve as an identifier and registering the video at a designated server: This step involves creating a hash code that uniquely identifies each original video. The video is then registered and associated with this hash code at a designated server, ensuring its proper tracking and identification.

2. Tracking video streaming requests initiated by the video player or communication device: This step involves monitoring and recording the requests made to stream the video. The system keeps track of when and from where these requests originate, allowing for accurate tracking of video views.

3. Marking the video in the metadata or header to indicate it has been tracked, including information such as the location and IP address: In this step, the video's metadata or header is modified to indicate that it has been tracked. Information such as the location and IP address from where the video is accessed is included, enabling further analysis and tracking.

4. Identifying tracked videos by computing the hash code of each video and transmitting the computed hash code to a designated communication server: This step involves computing the hash code of the tracked video and transmitting it to a designated communication server. The hash code serves as a unique identifier for the video and aids in accurate identification and tracking.

5. Aggregating reports of transmitted hash codes at the designated server and identifying the original video associated with each transmitted hash code: The communication server receives the reports containing the transmitted hash codes and aggregates them. By analyzing the hash codes, the server identifies the original video associated with each hash code, facilitating accurate tracking and analysis.

6. Computing the number of views or stream requests for each original video: This final step involves calculating the total number of views or stream requests received for each original video. By aggregating the data collected from the transmitted hash codes, the system determines the popularity and usage statistics for each video.

By implementing this method, video usage and views can be accurately tracked across various communication devices and platforms. The unique hash codes assigned to each video, along with the tracking and analysis of streaming requests, ensure reliable data collection and enable insights into the popularity and usage patterns of the videos.

The present invention discloses A method for tracking video usage/views across various communication devices and platforms, including distribution through social networks or messaging platforms, comprising the following steps:

1. Inserting a code with a unique ID for each original video hash code, which serves as an identifier, and registering the video at a designated server: In this step, a code containing a unique ID is inserted into each original video. This code acts as an identifier for the video and is registered at a designated server. This ensures the proper tracking and identification of the video.

2. Tracking video streaming requests by the video player, utilizing the inserted code and extracting the video's unique ID: The system monitors and tracks the streaming requests made by the video player. By running the inserted code, the unique ID of the video is extracted. This allows for accurate tracking and identification of the video during streaming.

3. Identifying tracked videos by their unique ID and transmitting the unique ID to a designated communication server: This step involves using the extracted unique ID to identify the tracked videos. The system then transmits the unique ID to a designated communication server, ensuring that the tracking data is accurately sent for further analysis.

4. Aggregating reports of transmitted unique IDs at the designated server and identifying the original video associated with each transmitted unique ID: The communication server receives the reports containing the transmitted unique IDs and aggregates them. By analyzing the unique IDs, the server identifies the original video associated with each transmitted unique ID. This allows for accurate tracking and analysis of video usage.

5. Computing the number of views or stream requests for each original video: The system calculates the total number of views or stream requests received for each original video. By aggregating the data collected from the transmitted unique IDs, the system determines the popularity and usage statistics for each video.

By implementing this method, video usage and views can be accurately tracked across various communication devices and platforms. The use of unique IDs associated with each video, along with the tracking and extraction of these IDs during streaming, ensures reliable data collection and enables insights into the popularity and usage patterns of the videos.

The present invention discloses a method for tracking video usage/views at any communication device/platform, wherein the video is distributed thorough different social networks or messaging platforms, said method comprising the steps of:

generating for each original video hash code which identifies the video and registering video at a designated server;

tracking video streaming request by the video player or by communication device marking the video in the metadata or header the video was tracked (location ip address)

identifying tracked video by computing hash code of the video and transmitting computed hash to designated commination server;

aggregating reports of transmitted hash code at the designated server, identifying the original video for each transmitted hash code;

computing number of views/stream request for each original video;

The present invention discloses a method for tracking video usage/views at any communication device/platform, wherein the video is distributed thorough different social networks or messaging platforms, said method comprising the steps of:

inserting cod with unique ID for each original video hash code which identifies the video and registering video at a designated server;

tracking video streaming request by the video player by running the code and extracting video unique ID;

identifying tracked video by the unique ID and transmitting unique ID to designated commination server;

aggregating reports of transmitted hash code at the designated server, identifying the original video for each transmitted hash code;

computing number of views/stream request for each original video;

The present invention discloses a method for tracking video usage/views at any communication device/platform, wherein the video is distributed thorough different social networks or messaging platforms, implemented by one or more processors operatively coupled to a non-transitory computer readable storage device, on which are stored modules of instruction code that when executed cause the one or more processors to perform the steps of:

generating for each original video hash code which identifies the video and registering video at a designated server;

tracking video streaming request by the video player or by communication device identifying tracked video by computing hash code of the video and transmitting computed hash to designated commination server;

aggregating reports of transmitted hash code at the designated server, identifying the original video for each transmitted hash code;

computing number of views/stream request for each original video;

According to some embodiments of the present invention the method further comprising the step of: Identifying Streaming Parameters including volume, size of the viewing window, sharing the video, writing comments, feedback buttons, using translation subtitles, pausing the video at different times, and performing forward and backward actions According to some embodiments of the present invention the method further comprises the step of: Identifying user parameters including cookies, location, and preferences.

According to some embodiments of the present invention the method further comprises the step of: Identifying the Time of Displayed Advertisements.

According to some embodiments of the present invention the method further comprises the step of: Checking Viewing Policy.

According to some embodiments of the present invention the method further comprises the step of: Identifying Streaming Time if the Stream is Stopped Before the End.

According to some embodiments of the present invention the method the transmission to the sever is implemented by transmitting the collected video data to a designated reporting address by establishing a communication channel with the server and sending the relevant data for further processing and analysis.

According to some embodiments of the present invention the method further comprising the step of Calculating statistics of video streaming including: number of views, by type platform, Type player, location IP, time schedule, using translation subtitles, pausing video in different time, forward backward action.

According to some embodiments of the present invention the method further comprising the step of Identifying duplicate report of video stream from players and proxy servers based on video identified ID, timing, and identified user.

The present invention discloses a method for tracking video usage/views at any communication device/platform, wherein the video is distributed thorough different social networks or messaging platforms, implemented by one or more processors operatively coupled to a non-transitory computer readable storage device, on which are stored modules of instruction code that when executed cause the one or more processors to perform the steps of:

inserting cod with unique ID for each original video hash code which identifies the video and registering video at a designated server;

tracking video streaming request by the video player by running the code and extracting video unique ID;

identifying tracked video by the unique ID and transmitting unique ID to designated commination server;

aggregating reports of transmitted unique ID at the designated server, identifying the original video for each transmitted hash code;

computing number of views/stream request for each original video;

According to some embodiments of the present invention the identifying includes reading file Metadata to Extract Relevant Code by analyzing the metadata of the video file, extracts relevant codes from the metadata, which aids in accurately identifying and tracking the video.

The present invention discloses A system for tracking video usage/views at any communication device/platform, implemented on at least one non-transitory computer readable storage device and one or more processors operatively coupled to the storage device on which are stored modules of instruction code which when executed by said one or more processors implements:

Registration module configured to generate for each original video hash code which identifies the video and registering video at a designated server;

Identification analysis module for tracking video streaming request by the video player or by communication device and identifying tracked video by computing hash code of the video and transmitting computed hash to designated commination server;

reporting module configured to aggregated reports of transmitted hash code at the designated server, identifying the original video for each transmitted hash code and compute number of views/stream request for each original video.

BRIEF DESCRIPTION OF THE SCHEMATICS

The present invention will be more readily understood from the detailed description of embodiments thereof made in conjunction with the accompanying drawings of which:

FIG. 1A is a block diagram, depicting the components and the environment of the video tracking system, according to some embodiments of the invention.

FIG. 1B is a block diagram, depicting the components and the environment of the video tracking system, according to some embodiments of the invention.

FIG. 2A is a flowchart depicting the video player, according to some embodiments of the invention;

FIG. 3A presents a flowchart, depicting the video identification, according to some embodiments of the invention.

FIG. 4A presents a flowchart, depicting the video reporting, according to some embodiments of the invention.

FIG. 2B is a flowchart depicting the video player, according to some embodiments of the invention;

FIG. 3B presents a flowchart, depicting the video identification, according to some embodiments of the invention.

FIG. 4B presents a flowchart, depicting the video reporting, according to some embodiments of the invention.

FIG. 5 presents a flowchart, depicting the video reporting server 40, according to some embodiments of the invention.

DETAILED DESCRIPTION OF THE VARIOUS MODULES

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The following is a list of definitions of the terms used throughout this application, adjoined by their properties and examples.

Definition

Video instruction metadata contains data that are essential for drawing blueprints for the scene: including at least one of the following:

A composition of what elements to draw and where/when/how they should be drawn, transformed, animated, etc.).

The metadata may include text, images, and video, how they all move and appear throughout time together and with respect to each other.

The metadata includes data of the 'scene graph' of the scene (i.e. how the scene is to be drawn from all of its elements, and throughout time).

User

Tracking the viewing statistics of video streams on platforms like YouTube, Facebook, and other social networks serves several important purposes. Here are some key reasons why these statistics are essential:

Performance evaluation: Video streaming platforms need to assess the performance and popularity of the content they host. Viewing statistics provide valuable insights into how many people are watching a video, how long they are engaging with it, and how frequently it is being viewed. These metrics help platform administrators and content creators evaluate the success and impact of their videos, identify trends, and make informed decisions about future content creation.

User engagement analysis: By tracking viewing statistics, platforms can gauge user engagement levels. Metrics such as watch time, average view duration, and audience retention provide a deeper understanding of how captivating and appealing a video is to viewers. This information helps content creators and platform administrators refine their strategies and improve user experience by identifying areas of improvement or interest.

Content recommendation and personalization: Platforms leverage viewing statistics to power their recommendation algorithms. By analyzing user behavior, such as videos watched, duration of viewing sessions, and engagement patterns, these algorithms can suggest personalized content to individual users. This enhances user satisfaction by providing relevant and engaging videos, increasing user retention, and driving overall platform usage.

Advertisements and monetization: Video streaming platforms often rely on advertising as a primary source of revenue. Viewing statistics play a crucial role in attracting advertisers and determining ad placement and pricing. Advertisers are interested in metrics like the number of views, demographics of viewers, and engagement rates to assess the potential reach and effectiveness of their ad campaigns. Additionally, platforms can charge higher advertising fees for videos with higher view counts and user engagement.

Content moderation and copyright enforcement: Tracking viewing statistics helps platforms enforce copyright policies and content moderation guidelines. By monitoring views, platforms can identify potentially infringing or inappropriate content, track its spread, and take appropriate actions to remove or restrict access to such content. This ensures that the platform remains compliant with legal requirements and provides a safe and suitable environment for its users.

Decision-making and future planning: Viewing statistics provides data-driven insights for decision-making and strategic planning. By analyzing trends and patterns in viewer behavior, platforms and content creators can make informed choices regarding content creation, marketing strategies, platform features, and user engagement initiatives. This data helps them optimize their efforts to attract and retain viewers, ultimately benefiting both the platform and its users.

Overall, tracking viewing statistics on video streaming platforms is crucial for performance evaluation, user engagement analysis, personalized recommendations, monetization, content moderation, and decision-making. It allows platforms to improve their services, enhance user experiences, attract advertisers, and create a thriving ecosystem for content creators and viewers alike.

FIG. 1A is a detailed block diagram that illustrates the components and the overall environment of the video tracking system, as outlined in certain embodiments of the invention. The system incorporates various interconnected modules and platforms that collaborate to deliver efficient video tracking capabilities.

The Video Tracking Management Platform 1 comprised of a Video Player 10 equipped with a designated SDK/API, which enables the playback of the original video file 20. The video file includes an embedded code containing a file ID and code for reporting the use of the file, as well as at least one reporting address (which can be multiple).

Within Media Video Player 10, there is a module responsible for identifying the user code, analyzing user behavior associated with the video streaming and activating the reporting code.

Video Server Management 30 is configured to collect the reported data from all players and track the number of streams for each identified video.

The Reporting Servers Management 30 is responsible for receiving reports of usage from various types of video players and video platforms. It also provides statistical information based on these reports.

The Media Video player 10 include module for identifying user code analyzing user behavior and activating reporting code Video Server management is configured to collect reported data from all players and track number streaming for each identified video.

Optionally each video owner registers the video with his identity, with its ID number.

According to some embodiments of the present invention, the platform comprises a Proxy tracking module which is configured to identify video stream when transferred to the client browser in top/ip/protocol identifying movie ID Reporting the server checks if browser ID Add temp id/reporting code of reporting for registered or not register play Identifying user agent/player to avoid duplicate reporting.

The core component of the system is the Video Tracking Management Platform 1. This platform comprises a Video Player 10, which is equipped with a designated Software Development Kit (SDK) or Application Programming Interface (API). This specialized SDK/API enables the playback of the original video file 2. The video file itself contains an embedded code that includes a unique file ID and code for reporting the file's usage. Additionally, it may include multiple reporting addresses.

Within the Media Video Player 10B, there exists a dedicated module responsible for identifying the user code and analyzing user behavior associated with the video streaming process. This module plays a crucial role in activating the reporting code, ensuring that relevant data is collected accurately.

The Video Server Management component is specifically configured to collect the reported data from all players within the system. Its primary function is to track the number of streams for each identified video. By monitoring and aggregating this information, it provides valuable insights into the popularity and usage patterns of different videos.

On the other hand, the Reporting Servers Management is responsible for receiving usage reports generated by various types of video players and video platforms. It serves as a central hub for collecting these reports and provides statistical information based on the accumulated data. This enables comprehensive analysis and reporting of video usage trends.

Optionally, video owners have the choice to register their videos with the system, associating them with their respective identities and unique ID numbers. This registration process ensures better control and management over the tracked videos.

In some embodiments of the invention, the platform incorporates a Proxy tracking module 70. This module is specifically designed to identify video streams as they are transferred to the client's browser using TCP/IP protocols. It employs techniques to identify the movie ID associated with each video stream, enabling accurate tracking and reporting.

When a video is played, the Reporting Server checks whether the browser ID is registered or not. If the browser ID is registered, a temporary ID or reporting code is added to the reporting for that play. This process helps maintain accurate records and prevents duplicate reporting.

Furthermore, the system also includes mechanisms for identifying user agents or players. This ensures that duplicate reporting is avoided by distinguishing between distinct users and their respective video playback instances.

Overall, the video tracking system depicted in FIG. 1A offers a comprehensive solution for tracking video usage, collecting relevant data, and generating meaningful insights. It incorporates various modules and platforms that work FIG. 1A is a detailed block diagram that illustrates the components and the overall environment of the video tracking system, as outlined in certain embodiments of the invention. The system integrates various interconnected modules and platforms that collaborate to deliver efficient video tracking capabilities.

Video Tracking Management Platform (1)

The core component of the system is the Video Tracking Management Platform (1). This platform consists of a Video Player (10) equipped with a designated Software Development Kit (SDK) or Application Programming Interface (API). This specialized SDK/API facilitates the playback of the original video file (20), which contains an embedded code. This code includes a unique file ID and instructions for reporting the file's usage. Additionally, it may incorporate multiple reporting addresses for enhanced tracking.

Within the Media Video Player (10), there exists a dedicated module responsible for identifying the user code, analyzing user behavior associated with the video streaming process, and activating the reporting code. This ensures that relevant data is collected accurately and efficiently.

Video Server Management (30)

The Video Server Management (30) component is specifically configured to collect the reported data from all players within the system. Its primary function is to track the number of streams for each identified video, providing valuable insights into the popularity and usage patterns of different videos.

Reporting Servers Management (30)

The Reporting Servers Management (30) is responsible for receiving usage reports generated by various types of video players and platforms. It serves as a central hub for collecting these reports and provides statistical information based on the accumulated data, enabling comprehensive analysis and reporting of video usage trends.

Optional Video Registration

Optionally, video owners can register their videos with the system, associating them with their respective identities and unique ID numbers. This registration process ensures better control and management over the tracked videos.

Proxy Tracking Module (70)

In some embodiments of the invention, the platform incorporates a Proxy Tracking Module (70). This module is designed to identify video streams as they are transferred to the client's browser using TCP/IP protocols. It employs techniques to identify the movie ID associated with each video stream, enabling accurate tracking and reporting.

When a video is played, the Reporting Server checks whether the browser ID is registered or not. If the browser ID is registered, a temporary ID or reporting code is added to the reporting for that play. This process helps maintain accurate records and prevents duplicate reporting.

User Agent Identification

Furthermore, the system includes mechanisms for identifying user agents or players, ensuring that duplicate reporting is avoided by distinguishing between distinct users and their respective video playback instances.

FIG. 1B is a block diagram, depicting the components and the environment of the video tracking system, according to some embodiments of the invention.

In this embodiment, the video platform employs a method of identifying videos by calculating a hash code of each video. To ensure accurate tracking and association, video owners register their videos with the platform, providing their identity along with the calculated hash code.

When a video is streamed, either through player 10B or the proxy server module 60, the system calculates the hash code of the streamed video. This calculated hash code is then reported to the reporting server, which enables the accurate tracking of video usage.

The hash code may represent only part of movie, of different technical versions or different content versions with different subtitles;

By utilizing hash codes, the video platform ensures a reliable and efficient means of identifying videos. The hash code serves as a unique identifier for each video, allowing for precise tracking and reporting. This method enhances the overall accuracy and integrity of the video tracking system, providing a robust solution for monitoring video usage and associated metrics.

FIG. 3A I am flowchart depicting the video player, according to some embodiments of the invention.

The Media Video player is a crucial component of the video tracking system and consists of two main modules:

The module for identifying videos by Read file meta data to extract the relevant code: Additionally, this module analyzes user behavior related to the video, providing valuable insights into how users interact with the content.

The Reporting module: This module is specifically configured to transmit data to a single, global unique reporting server. Its primary function is to gather relevant information about the video playback and user behavior and transmit this data to the designated reporting server. By sending the data to a central reporting server, the system ensures consolidated and comprehensive reporting of video usage across the platform.

FIG. 2B is a flowchart depicting the video player, according to some embodiments of the invention.

The Media Video player is a crucial component of the video tracking system and consists of two main modules:

The module for identifying videos by their hash codes: This module is responsible for calculating the hash code of the video being played. The hash code serves as a unique identifier for the video and allows for accurate tracking and reporting. Additionally, this module analyzes user behavior related to the video, providing valuable insights into how users interact with the content.

1. The Reporting module: This module is specifically configured to transmit data to a single, global unique reporting server. Its primary function is to gather relevant information about the video playback and user behavior and transmit this data to the designated reporting server. By sending the data to a central reporting server, the system ensures consolidated and comprehensive reporting of video usage across the platform.

FIG. 3A depicts a flowchart that illustrates the video identification process, as outlined in certain embodiments of the invention. This flowchart demonstrates the steps involved in identifying and tracking videos within the system.

The video identification module applies at least one of the following steps:

Reading file metadata to extract relevant code (1110A): This step involves analyzing the metadata of the video file. The system extracts the relevant code (e.g., embedded codes, tags, or identifiers) from the metadata, which helps in accurately identifying and tracking the video.

Identifying streaming time if the stream is stopped before the end (1120A): This step focuses on determining the duration of the video stream. If the user stops streaming the video before it reaches the end, this information is recorded for tracking purposes.

Identifying streaming parameters such as volume, size of viewing window, sharing video, writing comments, adding like emoticon, using translation subtitles, pausing video at different times, and performing forward and backward actions (1130A): This step involves capturing various parameters related to the user's interaction with the video. These parameters can include adjusting the volume, resizing the viewing window, sharing the video, adding comments or likes, utilizing translation subtitles, pausing the video at different times, and performing actions such as fast-forwarding or rewinding.

Identifying user parameters such as cookies, location, and preferences (1140A): This step focuses on collecting user-specific parameters. These can include information stored in cookies, user location data, and user preferences. By identifying these parameters, the system can gain insights into the user's context and tailor the tracking process accordingly.

Identifying the time of displayed advertisements (1150A): This step involves tracking the timing of displayed advertisements during video playback. It records the duration and placement of advertisements within the video stream, providing valuable data on ad performance and user engagement.

Identifying the ID of the file and reporting address (1120A): This step is essential for accurately tracking and reporting the video. The system identifies the unique ID associated with the video file and determines the reporting address or addresses where the tracking data should be sent.

Optionally, the player checks the viewing policy of the file to determine if it is public or private. If the file is marked as private, it is not tracked or monitored. This ensures privacy and compliance with the viewing preferences set by the content owner.

By following these steps in the video identification process, the system can gather comprehensive data on video usage, user interactions, and other relevant parameters. This information forms the basis for generating accurate tracking reports.

A more detailed description of the flowchart demonstrates the steps involved in identifying and tracking videos within the system.

Video Identification Process
Video Identification Module Steps:

1. Reading File Metadata to Extract Relevant Code (1110A):
   This step involves analyzing the metadata of the video file. The system extracts relevant codes (e.g., embedded codes, tags, or identifiers) from the metadata, which aids in accurately identifying and tracking the video.

2. Identifying Streaming Time if the Stream is Stopped Before the End (1120A):
   This step focuses on determining the duration of the video stream. If the user stops streaming the video before it reaches the end, this information is recorded for tracking purposes.

3. Identifying Streaming Parameters (1130A):
   This step captures various parameters related to the user's interaction with the video. These parameters can include:
   Adjusting the volume
   Resizing the viewing window
   Sharing the video
   Adding comments or likes
   Utilizing translation subtitles
   Pausing the video at different times
   Performing actions such as fast-forwarding or rewinding 4. Identifying User Parameters (1140A):
   This step focuses on collecting user-specific parameters. These can include:
   Information stored in cookies
   User location data
   User preferences By identifying these parameters, the system can gain insights into the user's context and tailor the tracking process accordingly.

5. Identifying the Time of Displayed Advertisements (1150A):

This step involves tracking the timing of displayed advertisements during video playback. It records the duration and placement of advertisements within the video stream, providing valuable data on ad performance and user engagement.

6. Identifying the ID of the File and Reporting Address (1120A):

This step is essential for accurately tracking and reporting the video. The system identifies the unique ID associated with the video file and determines the reporting address or addresses where the tracking data should be sent.

7. Checking Viewing Policy (Optional) (1160A):

Optionally, the player checks the viewing policy of the file to determine if it is public or private. If the file is marked as private, it is not tracked or monitored. This ensures privacy and compliance with the viewing preferences set by the content owner.

By following these steps in the video identification process, the system can gather comprehensive data on video usage, user interactions, and other relevant parameters. This information forms the basis for generating accurate tracking reports FIG. 4A illustrates a flowchart that outlines the video reporting process, as described in certain embodiments of the invention. This flowchart demonstrates the steps involved in reporting video data to the server.

The video reporting module applies at least one of the following steps:

Sending communication to the server's reporting address (1210): This step involves transmitting the gathered video data to the designated reporting address or addresses. The reporting module establishes a communication channel with the server and sends the relevant data for further processing and analysis.

This step ensures that the collected information, such as video identification, user behavior, streaming parameters, user parameters, advertisement timing, and file ID, is efficiently reported to the server. By sending the data to the reporting address, the system enables comprehensive tracking, analysis, and generation of statistical reports based on the accumulated data.

Additionally, this step may involve sending the data in a structured format, ensuring that the information is properly organized and categorized for easy analysis and utilization by the server-side reporting system.

The reporting module plays a crucial role in the video tracking system by facilitating the transfer of data to the reporting server. This ensures that accurate and valuable insights can be derived from the gathered information, ultimately leading to a better understanding of video usage patterns and user behavior.

Overall, the video reporting process, as depicted in FIG. 4A, emphasizes the importance of transmitting the collected video data to the designated reporting address, providing the necessary information for com FIG. 3B represents a flowchart that outlines the Identification analysis module within the system, as described in certain embodiments of the invention.

The video identification module applies at least one of the following steps:

Calculating the hash of the video (1110B): This step involves generating a unique hash code for the video. The hash code serves as a distinctive identifier that enables accurate identification and tracking of the video within the system.

Reading file metadata to extract relevant code (11101B): This step focuses on analyzing the metadata of the video file. By extracting the relevant code, such as embedded codes or tags, the system can accurately identify and track the video.

Identifying streaming time if the stream is stopped before the end (1120B): This step determines the duration of the video stream. If the user stops streaming the video before reaching the end, this information is recorded for tracking purposes.

Identifying streaming parameters such as volume, size of the viewing window, sharing the video, writing comments, adding like emoticons, using translation subtitles, pausing the video at different times, and performing forward and backward actions (1130B): This step involves capturing various parameters related to the user's interaction with the video. These parameters provide valuable insights into how the user engages with the content.

Identifying user parameters such as cookies, location, and preferences (1140B): This step focuses on collecting user-specific parameters. These can include information stored in cookies, the user's location data, and their preferences. By identifying these parameters, the system gains insights into the user's context and can tailor the tracking process accordingly.

Reporting the video hash (1160A): This step involves reporting the generated hash code of the video. The video hash serves as a unique identifier and aids in accurate tracking and reporting of the video.

FIG. 4A illustrates a flowchart that outlines the video reporting process, as described in certain embodiments of the invention. This flowchart demonstrates the steps involved in reporting video data to the server.

Video Reporting Process

Video Reporting Module Steps:

1. Sending Communication to the Server's Reporting Address (1210):

This step involves transmitting the gathered video data to the designated reporting address or addresses. The reporting module establishes a communication channel with the server and sends the relevant data for further processing and analysis.

This step ensures that the collected information, such as:

Video identification

User behavior

Streaming parameters

User parameters

Advertisement timing

File ID is efficiently reported to the server. By sending the data to the reporting address, the system enables comprehensive tracking, analysis, and generation of statistical reports based on the accumulated data.

Additionally, this step may involve sending the data in a structured format, ensuring that the information is properly organized and categorized for easy analysis and utilization by the server-side reporting system.

The reporting module plays a crucial role in the video tracking system by facilitating the transfer of data to the reporting server. This ensures that accurate and valuable insights can be derived from the gathered information, ultimately leading to a better understanding of video usage patterns and user behavior.

FIG. 4B presents a flowchart that illustrates the video reporting process within the system, according to certain embodiments of the invention.

The video reporting module applies at least one of the following steps:

Sending communication to the server's reporting address (1201B): This step involves transmitting the collected video data to the designated reporting address. The reporting module establishes a communication channel with the server and sends the relevant data for further processing and analysis.

By sending the data to the reporting address, the system ensures that the collected information is efficiently reported to the server for comprehensive analysis and reporting. This step enables the generation of statistical reports and insights based on the accumulated data.

The video reporting process, as depicted in FIG. 4B, highlights the significance of transmitting the collected video data to the designated reporting address. This facilitates the analysis of video usage patterns, user behavior, and other relevant metrics, ultimately providing valuable insights for the video tracking system.

FIG. 5 presents a flowchart, depicting the video reporting server 40, according to some embodiments of the invention.

The video reporting server 40 apply at least one of the following steps:

Receiving reports of video streaming from players and/or proxy servers. 402

Calculating statistics of video streaming: number of views, by type platform. Type player, location IP, time schedule 404;

Identifying duplicate report of video stream from players and proxy servers based on video identified ID, timing, and identified user 406

Calculating statistics of streaming parameters volume, size of viewing window, sharing video, writing comments, adding like emoticon, using translation subtitles, pausing video in different time, forward backward action 408;

The system of the present invention may include, according to certain embodiments of the invention, machine-readable memory containing or otherwise storing a program of instructions which, when executed by the machine, implements some or all of the apparatus, methods, features, and functionalities of the invention shown and described herein. Alternatively, or in addition, the apparatus of the present invention may include, according to certain embodiments of the invention, a program as above which may be written in any conventional programming language, and optionally a machine for executing the program such as but not limited to a general-purpose computer which may optionally be configured or activated in accordance with the teachings of the present invention. Any of the teachings incorporated herein may, wherever suitable, operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field-programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read-only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for tracking video usage/views at any communication device/platform, wherein the video is distributed thorough different social networks or messaging platforms, implemented by one or more processors operatively coupled to a non-transitory computer readable storage device, on which are stored modules of instruction code that when executed cause the one or more processors to perform the steps of:

generating for each original video hash code which identifies the video and registering video at a designated server;

tracking video streaming request by the video player or by communication device;

identifying tracked video by computing hash code of the video and transmitting computed hash to designated commination server;

aggregating reports of transmitted hash code at the designated server, identifying the original video for each transmitted hash code;

computing number of views/stream request for each original video; and identifying duplicate report of video stream from players and proxy servers based on video identified ID, timing, and identified user.

2. The method of claim 1 further comprising the step of: Identifying Streaming Parameters including volume, size of the viewing window, sharing the video, writing comments, feedback buttons, using translation subtitles, pausing the video at different times, and performing forward and backward actions.

3. The method of claim 1 further comprising the step of: Identifying user parameters including cookies, location, and preferences.

4. The method of claim 1 further comprising the step of: Identifying the Time of Displayed Advertisements.

5. The method of claim 1 further comprising the step of: Checking Viewing Policy.

6. The method of claim 1 further comprising the step of: Identifying Streaming Time if the Stream is Stopped Before the End.

7. The method of claim 1 further wherein the transmission to the sever is implemented by transmitting the collected video data to a designated reporting address by establishing a communication channel with the server and sending the relevant data for further processing and analysis.

8. The method of claim 1 further comprising the step of Calculating statistics of video streaming including: number of views, by type platform, Type player, location IP, time schedule, using translation subtitles, pausing video in different time, forward backward action.

9. A method for tracking video usage/views at any communication device/platform, wherein the video is distributed thorough different social networks or messaging platforms, implemented by one or more processors operatively coupled to a non-transitory computer readable storage device, on which are stored modules of instruction code that when executed cause the one or more processors to perform the steps of:

inserting code with unique ID for each original video hash code which identifies the video and registering video at a designated server;

tracking video streaming request by the video player by running the code and extracting video unique ID;

identifying tracked video by the unique ID and transmitting unique ID to designated commination server;

aggregating reports of transmitted unique ID at the designated server, identifying the original video for each transmitted hash code;

computing number of views/stream request for each original video; and identifying duplicate report of video stream from players and proxy servers based on video identified ID, timing, and identified user.

10. The method of claim 9 wherein identifying include reading file Metadata to Extract Relevant Code by analyzing the metadata of the video file, extracts relevant codes from the metadata, which aids in accurately identifying and tracking the video.

11. A system for tracking video usage/views at any communication device/platform, implemented on at least one non-transitory computer readable storage device and one or more processors operatively coupled to the storage device on which are stored modules of instruction code which when executed by said one or more processors implements:

generating for each original video hash code which identifies the video and registering video at a designated server;

tracking video streaming request by the video player or by communication device and identifying tracked video by computing hash code of the video and transmitting computed hash to designated commination server;

aggregating reports of transmitted hash code at the designated server, identifying the original video for each transmitted hash code and compute number of views/ stream request for each original video; and identifying duplicate report of video stream from players and proxy servers based on video identified ID, timing, and identified user.

12. The system of claim 11 further comprising Identifying Streaming Parameters including volume, size of the viewing window, sharing the video, writing comments, feedback buttons, using translation subtitles, pausing the video at different times, and performing forward and backward actions.

13. The system of claim 11 further to comprising Identifying user parameters including cookies, location, and preferences.

14. The system of claim 11 further comprising Identifying the Time of Displayed Advertisements.

15. The system of claim 11 further comprising the step of: Checking Viewing Policy.

16. The system of claim 11 further comprising the step of: Identifying Streaming Time if the Stream is Stopped Before the End.

17. The system of claim 11 further comprising calculating statistics of video streaming including: number of views, by type platform, Type player, location IP, time schedule, using translation subtitles, pausing video in different time, forward backward action.

\* \* \* \* \*